(12) United States Patent
Kim et al.

(10) Patent No.: US 12,520,879 B2
(45) Date of Patent: Jan. 13, 2026

(54) AEROSOL GENERATING DEVICE AND METHOD OF CONTROLLING THE SAME

(71) Applicant: KT&G CORPORATION, Daejeon (KR)

(72) Inventors: Yong Hwan Kim, Gyeonggi-do (KR); Dae Nam Han, Seoul (KR); Sung Wook Yoon, Gyeonggi-do (KR); Seung Won Lee, Gyeonggi-do (KR)

(73) Assignee: KT&G Corporation, Daejeon (KR)

( * ) Notice: Subject to any disclaimer, the term of this patent is extended or adjusted under 35 U.S.C. 154(b) by 652 days.

(21) Appl. No.: 17/795,160

(22) PCT Filed: May 11, 2021

(86) PCT No.: PCT/KR2021/005902
§ 371 (c)(1),
(2) Date: Jul. 25, 2022

(87) PCT Pub. No.: WO2021/235761
PCT Pub. Date: Nov. 25, 2021

(65) Prior Publication Data
US 2023/0058326 A1 Feb. 23, 2023

(30) Foreign Application Priority Data
May 19, 2020 (KR) .................. 10-2020-0059817

(51) Int. Cl.
*A24F 40/53* (2020.01)
*A24F 40/60* (2020.01)
*A24F 40/65* (2020.01)

(52) U.S. Cl.
CPC .............. *A24F 40/53* (2020.01); *A24F 40/60* (2020.01); *A24F 40/65* (2020.01)

(58) Field of Classification Search
CPC .......... A24F 40/53; A24F 40/60; A24F 40/65; A24F 40/20; A24F 40/50
See application file for complete search history.

(56) References Cited

U.S. PATENT DOCUMENTS 10,448,670 B2   10/2019   Talon et al.
2011/0265806 A1  11/2011   Alarcon et al.
(Continued)

FOREIGN PATENT DOCUMENTS

CN   204969459 U   1/2016
CN   106579560 A   4/2017
(Continued)

OTHER PUBLICATIONS

Japanese Office Action dated Jan. 16, 2024 in Application No. 2022-548473.
(Continued)

*Primary Examiner* — Curtis J King
(74) *Attorney, Agent, or Firm* — Foley & Lardner LLP (57) ABSTRACT

An aerosol generating device according to an aspect may include a display; and a processor configured to monitor states of a plurality of modules included in the aerosol generating device, determine an overall state of the aerosol generating device based on monitoring results, and control the display to output an visual information representing the overall state.

12 Claims, 4 Drawing Sheets

(56) References Cited

U.S. PATENT DOCUMENTS

| | | | |
|---|---|---|---|
| 2012/0029852 A1* | 2/2012 | Goff | G01R 31/371 |
| | | | 702/63 |
| 2012/0170616 A1* | 7/2012 | Tsai | G01K 7/01 |
| | | | 374/163 |
| 2014/0345633 A1 | 11/2014 | Talon et al. | |
| 2017/0027234 A1 | 2/2017 | Farine et al. | |
| 2017/0245217 A1* | 8/2017 | Kim | H04W 52/0264 |
| 2017/0273358 A1 | 9/2017 | Batista et al. | |
| 2018/0070632 A1 | 3/2018 | Sur et al. | |
| 2018/0093054 A1 | 4/2018 | Bowen et al. | |
| 2018/0176990 A1 | 6/2018 | Ouyang et al. | |
| 2019/0387795 A1 | 12/2019 | Fisher et al. | |
| 2020/0000143 A1 | 1/2020 | Anderson et al. | |
| 2020/0336618 A1* | 10/2020 | Kadobayashi | G05D 23/1917 |
| 2021/0145073 A1 | 5/2021 | Lee et al. | |
| 2022/0021035 A1* | 1/2022 | Kim | G01R 31/3835 |
| 2022/0060873 A1 | 2/2022 | Kersey et al. | |
| 2022/0202089 A1* | 6/2022 | Illidge | F16L 59/02 |
| 2022/0295901 A1* | 9/2022 | Li | A24F 40/51 |
| 2023/0143355 A1* | 5/2023 | Rogan | A24F 40/65 |
| | | | 131/328 |
| 2023/0165314 A1* | 6/2023 | Yan | G01R 19/16576 |
| | | | 131/328 |
| 2023/0180850 A1* | 6/2023 | Yilmaz | A24F 40/53 |
| | | | 131/328 |
| 2024/0122261 A1* | 4/2024 | Moloney | A24F 40/65 |
| 2024/0122262 A1* | 4/2024 | Moloney | A61M 15/06 |
| 2024/0122263 A1* | 4/2024 | Rosser | A61M 15/06 |
| 2024/0122264 A1* | 4/2024 | Rosser | G16H 40/63 |
| 2024/0130433 A1* | 4/2024 | Moloney | H04L 67/306 |
| 2024/0179805 A1* | 5/2024 | Batista | A24D 1/20 |
| 2024/0179806 A1* | 5/2024 | Reevell | A24F 40/53 |
| 2024/0222731 A1* | 7/2024 | Bertness | H01M 10/486 |
| 2024/0225122 A1* | 7/2024 | Pilatowicz | H02J 7/0063 |
| 2024/0341349 A1* | 10/2024 | Jung | A24F 40/465 |
| 2025/0000154 A1* | 1/2025 | Taylor | A24F 40/10 |

FOREIGN PATENT DOCUMENTS

| | | |
|---|---|---|
| CN | 110891808 A | 3/2020 |
| JP | 2020-68739 A | 5/2020 |
| JP | 6636198 B1 | 10/2020 |
| KR | 10-2019-0011264 A | 2/2019 |
| KR | 10-2019-0131114 A | 11/2019 |
| WO | 2019/049028 A1 | 3/2019 |

OTHER PUBLICATIONS

Korean Notice of Final Rejection for 10-2020-0059817 dated May 20, 2022.
Korean Notice of Final Rejection for 10-2020-0059817 dated, Nov. 26, 2021.
International Search Report for PCT/KR2021/005902 dated, Aug. 10, 2021 (PCT/ISA/210).
Written Opinion of the International Searching Authority for PCT/KR2021/005902 dated, Aug. 10, 2021 (PCT/ISA/210).
Chinese Office Action on CN Patent Application No. 202180013792.4 dated Feb. 28, 2025.
Chinese Office Action on CN Patent Appl. No. 202180013792.4 dated Dec. 5, 2025.

\* cited by examiner

AEROSOL GENERATING DEVICE AND METHOD OF CONTROLLING THE SAME

TECHNICAL FIELD

The present invention relates to an aerosol generating device and a method of controlling the same.

BACKGROUND ART

Recently, the demand for alternative methods to overcome the disadvantages of traditional cigarettes has increased. For example, there is growing demand for an aerosol device that generates aerosol by heating an aerosol generating material in cigarettes without combustion. Accordingly, researches on a heating-type cigarette and a heating-type aerosol generating device have been actively conducted.

DISCLOSURE OF INVENTION

Technical Problem

There is a need for a method that allows a user to quickly monitor the overall state of the aerosol generating device and/or the state of each module included in the aerosol generating device. The technical problem to be achieved by the present invention is not limited to the technical problems as described above, and other technical problems may be inferred from the following embodiments.

Solution to Problem

An aerosol generating device according to an aspect may include a display; and a processor configured to monitor states of a plurality of modules included in the aerosol generating device, determine an overall state of the aerosol generating device based on monitoring results, and control the display to output an visual information representing the overall state.

Advantageous Effects of Invention

According to the present invention, the overall state of the aerosol generating device may be determined by synthesizing the states of the modules included in the aerosol generating device, so that the user can check the current state of the aerosol generating device at a glance, and various actions can be taken depending on the current state of the aerosol generating device (e.g., reset the aerosol generating device, visit a repair center, etc.).

BEST MODE FOR CARRYING OUT THE INVENTION

An aerosol generating device according to an asp may include a display; and a processor configured to monitor states of a plurality of modules included in the aerosol generating device, determine an overall state of the aerosol generating device based on monitoring results, and control the display to Output an visual information representing the overall state.

The processor may be further configured to perform a mathematical operation using numerical values corresponding to the monitoring results, and to determine the overall state based on a result of the mathematical operation.

The processor may be further configured to determine the overall state by comparing the result of the mathematical operation with a preset reference.

The processor may be further configured to determine the overall state of the aerosol generating device based on a state of the processor and a state of a battery included in the aerosol generating device.

The processor may be further configured to monitor the state of the battery based on a temperature of the battery and information collected from a charger integrated circuit (IC) connected to the battery.

The processor may be further configured to monitor a state of the processor based on a temperature of a substrate including the processor and information collected from a heating IC connected to the processor.

The processor may be further configured to determine the overall state of the aerosol generating device based on a state of at least one sensor included in the aerosol generating device.

The processor may be further configured to determine the overall state of the aerosol generating device based on a state of a heater included in the aerosol generating device.

The processor may be further configured to control the display to output information indicating a state of each of the modules individually.

The processor may be further figured to control the display to output at least solution based on the overall state.

The aerosol generating device may further include a communication interface configured to perform wireless communication with an external device, and the processor may transmit data through the communication interface so that the visual information is output to the external device.

A method of controlling an aerosol generating device according to another aspect may include monitoring states of a plurality of modules included in the aerosol generating device; determining an overall state of the aerosol generating device based on monitoring results; and controlling a display to output visual information representing the overall state.

According to another aspect, a computer-readable recording medium may include a recording medium on which a program for executing the above-described method on a computer is recorded.

Mode for the Invention

Hereinafter, with reference to the accompanying drawings, embodiments of the present invention Will be described in detail so that those of ordinary skill in the art may easily implement the present invention. However, the present invention may be implemented in various different forms and is not limited to the embodiments described herein.

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

The term "aerosol generating article" may refer to any article that is designed for smoking by a person puffing on the aerosol generating article. The aerosol generating article may include an aerosol generating material that generates aerosols when heated even without combustion. For example, one or more aerosol generating articles may be loaded in an aerosol generating device and generate aerosols when heated by the aerosol generating device. The shape, size, material, and structure of the aerosol generating article may differ according to embodiments. Examples of the aerosol generating article may include, but are not limited to, a cigarette-shaped substrate and a cartridge. Hereinafter, the term "cigarette" (i.e., when used alone without a modifier such as "general," "traditional," or "combustive") may refer to an aerosol generating article which has a shape similar to a traditional combustive cigarette.

In addition, terms including ordinal numbers such as 'first' or 'second' used in the present specification may be used to describe various elements, but the elements should not be limited by terms. The terms are used only for the purpose of distinguishing one element from another.

Hereinafter, embodiments will be described in detail with reference to the drawings.

Figure 1:
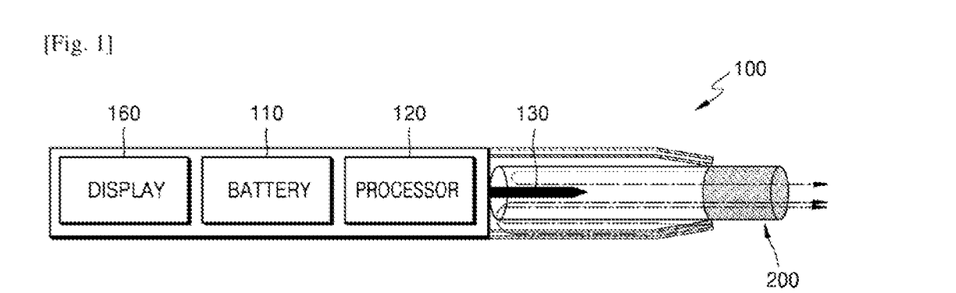
FIG. 1 is a diagram illustrating an example of an aerosol generating device.

FIG. 1 is a diagram illustrating an example of an aerosol generating device.

Referring to FIG. 1, an aerosol generating device 100 includes a battery 110, a processor 120, a heater 130, and a display 160. In addition, an aerosol generating article 200 may be inserted into the inner space of the aerosol generating device 100.

FIG. 1 illustrates components of the aerosol generating device 100, which are related to the present embodiment. Therefore, it will be understood by one of ordinary skill in the art related to the present embodiment that other general-purpose components may be further included in the aerosol generating device 100, in addition to the components illustrated in FIG. 1.

FIG. 1 illustrates that the battery 110, the processor 120, and the heater 130 are arranged in series. However, the internal structure of the aerosol generating device 100 is not limited to the structures illustrated in FIG. 1. In other words, according to the design of the aerosol generating device 100, the battery 110, the processor 120, and the heater 130 may be differently arranged.

When the aerosol generating article 200 is inserted into the aerosol generating device 100, the aerosol generating device 100 may operate the heater 130 to generate aerosol from the aerosol generating article 200. The aerosol generated by the heater 130 is delivered to a user by passing through the aerosol generating article 200.

As necessary, even when the aerosol generating article 200 is not inserted into the aerosol generating device 100, the aerosol generating device 100 may heat the heater 130.

The battery 110 may supply power to be used for the aerosol generating device 100 to operate. For example, the battery 110 may supply power to heat the heater 130, and may supply power for operating the processor 120. Also, the battery 110 may supply power for operations of a display 160, a sensor, a motor, etc. mounted in the aerosol generating device 100.

The processor 120 may generally control operations of the aerosol generating device 100. In detail, the processor 120 may control not only operations of the battery 110, and the heater 130, but also operations of other components included in the aerosol generating device 100. Also, the processor 120 may check a state of each of the components of the aerosol generating device 100 to determine whether or not the aerosol generating device 100 is able to operate.

A processor 120 can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The heater 130 may be heated by the power supplied from the battery 110. For example, when the aerosol generating article 200 is inserted into the aerosol generating device 100, the heater 130 may be located outside the aerosol generating article 200. Thus, the heated heater 130 may increase a temperature of an aerosol generating material in the aerosol generating, article 200.

The heater 130 may include an electro-resistive heater. For example, the heater 130 may include an electrically conductive track, and the heater 130 may be heated when currents flow through the electrically conductive track.

However, the heater 130 is not limited to the example described above and may include all heaters which may be heated to a desired temperature. Here, the desired temperature may be pre-set in the aerosol generating device 100 or may be set as a temperature desired by a user.

For example, the heater 130 may be elongate (e.g., rod-shaped, needle-shaped, blade-shaped) or cylindrical, and may heat the inside or outside of the aerosol generating article 200 according to the shape of the heating element.

Also, the aerosol generating device 100 may include a plurality of heaters 130. Here, the plurality of heaters 130 may be inserted into the aerosol generating article 200 or may be arranged outside the aerosol generating, article 200. Also, some of the plurality of heaters 130 may be inserted into the aerosol generating article 200 and the others may be arranged outside the aerosol generating article 200. In addition, the shape of the heater 130 is not limited to the shapes illustrated in FIG. 1 and may include various shapes.

The display 160 outputs visual information related to the aerosol generating device 100. Here, the visual information related to the aerosol generating device 100 may include any information related to the operation of the aerosol generating device 100. For example, the display 160 may transmit information about the state of the aerosol generating device 100 (e.g., whether the aerosol generating device is in an operable state, etc.), information about the heater 130 (e.g., information indicating preheating started, preheating is in progress, preheating is completed, etc.), information related to the battery 110 (e.g., the remaining capacity, availability of the battery 110, etc.), information related to reset of the aerosol generating device 100 (e.g., reset timing, whether reset is in progress or completed, etc.), information related to cleaning of the aerosol generating device 100 (e.g, cleaning timing, whether cleaning is required, whether cleaning is in progress or completed, etc.), and information related to charging device 100 (e.g., whether charging required, whether charging is in progress or completed, etc.), information related to puff (e.g., number of puffs, notification of puff end, etc.), or information related to safety (e.g., use time elapsed, etc.) of the aerosol generating.

In addition, the display 160 outputs vi visual information indicating the overall state the aerosol generating device 100. In detail, the display 160 may output visual information representing the overall state of the aerosol generating device 100 depending on a control signal of the processor 120.

Here, the overall state may be determined based on the states of the modules included in the aerosol generating device 100, In other words, the processor 120 may monitor the state of each of the modules and determine the overall state of the aerosol generating device 100 based on the monitoring results.

Meanwhile, the aerosol generating device 100 may further include other components in addition to the battery 110, the processor 120, the heater 130, and the display 160. For example, the aerosol generating device 100 may include a motor for outputting haptic information and/or a speaker for outputting auditory information. Also, the aerosol generating device 100 may include at least one sensor (e.g., a puff detecting sensor, a temperature detecting sensor, the aerosol generating article 200 insertion detecting sensor, etc.). Also, the aerosol generating device 100 may be formed as a structure that, even when the aerosol generating article 200 is inserted into the aerosol generating device 100, may introduce external air or discharge internal air.

Although not illustrated in FIG. 1, the aerosol generating device. 100 and an additional cradle may form together a system. For example, the cradle may be used to charge the battery 110 of the aerosol generating device 100. Alternatively, the heater 130 may be heated when the cradle and the aerosol generating device 100 are coupled to each other.

The aerosol generating article 200 may be similar to a general cigarette. For example, the aerosol generating article 200 may be divided into a first portion including an aerosol generating material and a second portion including a filter, etc. Alternatively, the second portion of the aerosol generating article 200 may also include an aerosol generating material. For example, an aerosol generating material made in the form of granules or capsules may be inserted into the second portion.

The entire first portion may be inserted into the aerosol generating device 100, and the second portion may be exposed to the outside. Alternatively, only a portion of the first portion may be inserted into the aerosol generating device 100, or the entire first portion and a portion of the second portion may be inserted into the aerosol generating device 100. The user may puff aerosol while holding the second portion by the mouth of the user. In this case, the aerosol is generated by the external air passing through the first portion, and the generated aerosol passes through the second portion and is delivered to the user's mouth.

For example, the external air may flow into at least one air passage formed in the aerosol generating device 100. For example, opening and closing of the air passage and/or a size of the air passage formed in the aerosol generating device 100 may be adjusted by the user. Accordingly, the amount of smoke and at smoking impression may be adjusted by the user. As another example, the external air may flow into the aerosol generating article 200 through at least one hole formed in a surface of the aerosol generating article 200.

Figure 2:
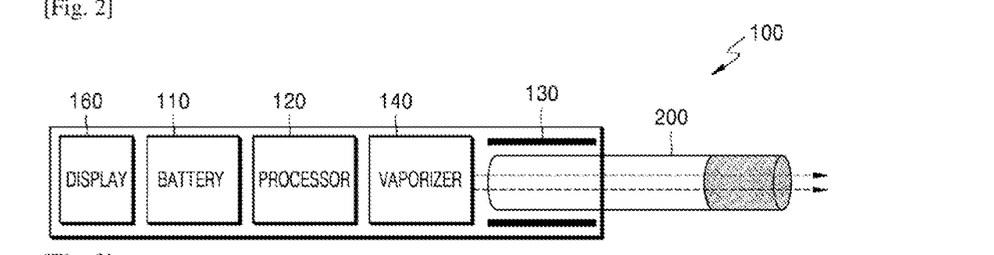
FIG. 2 is a diagram showing, another example of an aerosol generating device.

FIG. 2 is a diagram showing another example of an aerosol generating device.

Referring to FIG. 2, the aerosol generating device 100 further includes a vaporizer 140 in addition to the configurations shown in FIG. 1. An aerosol generating article 200, a battery 110, a processor 120, a heater 130, and a display 160 of FIG. 2 may correspond to the aerosol generating article 200, the battery 110, the processor 120, heater and the display 160 of FIG. 1. Therefore, descriptions previously given with reference to FIG. 1 are omitted.

FIG. 2 illustrate components of the aerosol generating device 100, which are related to the present embodiment. Therefore, it will be understood by one of ordinary skill in the art related to the present embodiment that other general-purpose components may be further included in the aerosol generating device 100, in addition to the components illustrated in FIG. 2.

Also, FIG. 2 illustrate that the aerosol generating device 100 includes the heater 130. However, as necessary, the heater 130 may be omitted.

FIG. 2 illustrates that the battery 110, the processor 120, the vaporizer 140, and the heater 130 are arranged in series.

When the aerosol generating article 200 is inserted into the aerosol generating device 100, the aerosol generating device 100 may operate the heater 130 and/or the vaporizer 140 to generate aerosol from the aerosol generating article 200 and/or the vaporizer 140. The aerosol generated by the heater 130 and/or the vaporizer 140 is delivered to a user by passing through the aerosol generating article 200.

The battery 110 may supply power so that the heater 130 and/or the vaporizer 140 may be heated. The processor 120 controls the operation of the vaporizer 140.

The vaporizer 140 may generate aerosol by heating a liquid composition and the generated aerosol may pass through the aerosol generating article 200 to be delivered to a user. In other words, the aerosol generated via the vaporizer 140 may move along an air flow passage of the aerosol generating device 100 and the air flow passage may be configured such that the aerosol generated via the vaporizer 140 passes through the aerosol generating article 200 to be delivered to the user.

For example, the vaporizer 140 may include a liquid storage, a liquid delivery element, and a heating element, but it is not limited thereto. For example, the liquid the liquid delivery element, and the heating element may be included in the aerosol generating device 100 as independent modules.

The liquid storage may store a liquid composition. For example, the liquid composition may be a liquid including a tobacco-containing material having a volatile tobacco flavor component, or a liquid including a non-tobacco material. The liquid storage may be formed to be detachable from the vaporizer 140 or may be formed integrally with the vaporizer 140.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivery element. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated.

For example, the vaporizer 140 may be referred to as a cartomizer or an atomizer, but it is not limited thereto.

Figure 3:
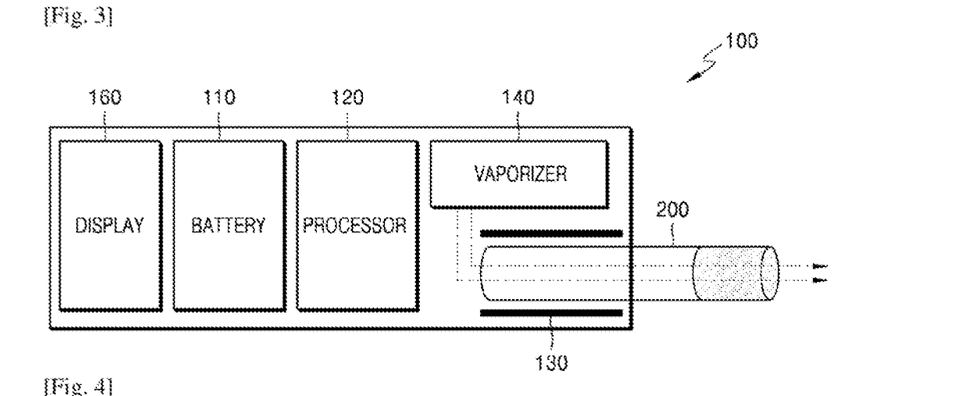
FIG. 3 is a diagram showing another example of an aerosol generating device.

FIG. 3 is a diagram illustrating another example of an aerosol generating device.

An aerosol generating article 200, a battery 110, a processor 120, a heater 130, a vaporizer 140, and a display 160 of FIG. 3 may correspond to the aerosol generating article 200, the battery 110, the heater 130, the vaporizer 140, and the display 160 of FIG. 2. Therefore, descriptions previously given with reference to FIG. 2 are omitted.

FIG. 3 shows an example in which the vaporizer 140 and the heater 130 are arranged in parallel, whereas FIG. 2 shows that the vaporizer 140 and the heater 130 may be arranged in series. However, the internal structure of the aerosol generating device 100 is not limited to those shown in FIGS. 2 and 3. In other words, according to the design of the aerosol generating device 100, the battery 110, the processor 120, the heater 130, and the vaporizer 140 may be differently arranged.

Figure 4:
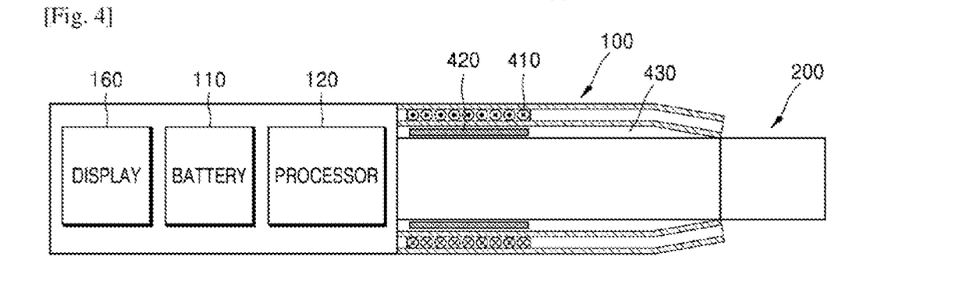
FIG. 4 is a diagram illustrating another example of an aerosol generating device.

FIG. 4 is a diagram illustrating another example of an aerosol generating device.

Referring to FIG. 4, an aerosol generating device 100 includes a battery 110, a processor 120, a display 160, a coil 410, and a susceptor 420. In addition, at least a part of the aerosol generating article 200 may be accommodated in a cavity 430 of the aerosol generating device 100. The aerosol generating article 200, the battery 110 the processor 120, and the display 160 of FIG. 4 may correspond to the aerosol generating article 200, the battery 110, the processor 120, and the display 160 of FIGS. 1 to 3. Therefore, descriptions previously given with reference to FIGS. 1 to 3 are omitted. In addition, the induction coil 410 and the susceptor 420 may serve as the heater 130.

FIG. 4 only shows certain components particularly related to the present embodiment. Therefore, it may be understood by those of ordinary skill in the art related to the present embodiment that other components may be further included in the aerosol generating device 100.

The induction coil 410 may be wound around e cavity 430. FIG. 4 illustrates that the induction coil 410 is disposed to surround the cavity 430, but is not limited thereto.

When the aerosol generating article 200 is accommodated in the cavity 430 of the aerosol generating device 100, the aerosol generating device 100 may supply power to the induction coil 410 so that the induction coil 410 generates a magnetic field. As the magnetic field generated by the induction coil 410 passes through the susceptor 420, the susceptor 420 may be heated.

This induction heating can be ex lined by Faraday's Law of induction. In detail, when the magnetic induction in the susceptor 420 changes, an electric field is generated in the susceptor 420, so that an eddy current flows in the susceptor 420. The eddy current generates heat proportional to the current density and conductor resistance of the susceptor 420.

As the susceptor 420 is heated by the eddy current, and the aerosol generating material in the aerosol generating article 200 is heated by the heated susceptor 420, thereby generating an aerosol. The aerosol generated from the aerosol generating material passes through the aerosol generating article 200 and is delivered to the user.

The battery 110 may supply power so that the induction coil 410 may generate a magnetic field. The processor 120 may be electrically connected to the induction coil 410.

The induction coil 410 may be an electrically conductive coil that generate magnetic field by power supplied from the battery 110. The induction coil 410 may be disposed to surround at least a portion of the cavity 430. The magnetic field generated by the induction coil 410 may be applied to the susceptor 420 positioned at the corner of the cavity 430.

The susceptor 420 is heated by the magnetic field generated from the induction coil 410, and may include metal or carbon. For example, the susceptor 420 may include at least one of ferrite, ferromagnetic alloy, stainless steel, and aluminum.

In addition, the susceptor 42 may include at least one of ceramics such as graphite, molybdenum, silicon carbide, niobium, nickel alloy, metal film, zirconia, etc., a transition metal such as nickel (Ni) or cobalt (Co), and a metalloid such as boron (B) or phosphorus (P). However, the susceptor 420 is not limited to the above-described example, and may be applicable without limitation as long as it may be heated to a desired temperature as a magnetic field is applied. Here, the desired temperature may be preset in the aerosol generating device 100 or may be set to a desired temperature by the user.

When the aerosol generating article 200 is accommodated in the cavity 430 of the aerosol generating device 100, the susceptor 420 may be disposed to surround at least a portion of the aerosol generating article 200. Accordingly, the heated susceptor 420 may increase the temperature of the aerosol generating material in the aerosol generating article 200.

FIG. 4 illustrates that the susceptor 420 is disposed to surround at least a portion of the aerosol generating article, but is not limited thereto. For example, the susceptor 420 may include a tubular heating element, a plate-shaped heating element, a needle-shaped heating element, or a rod-shaped heating element, and may heat the interior and/or exterior of the aerosol-generating article 200 depending on the shape of the heating element.

Also, the aerosol generating device 100 may include a plurality of susceptors 420. Here, the plurality of susceptors 420 may be inserted the aerosol generating article 200 or may be arranged outside the aerosol generating article 200. Also, some of the plurality of susceptors 420 may be inserted into the aerosol generating article 200 and the others may be arranged outside the aerosol generating article 200. In addition, the shape of susceptors 420 is not limited to the shapes illustrated in FIG. 4 and may include various shapes.

The aerosol generating device 100 may include a plurality of modules. In detail, in addition to the battery 110, the processor 120, the heater 130 (e.g., the induction coil 410 and the susceptor 420), the vaporizer 140 and the display 160 shown in FIGS. 1 to 4, the aerosol generating device 100 may further include other modules such as sensors.

Accordingly, the overall state of the aerosol generating device 100 is affected by the states of the modules included in the aerosol generating device 100. For example, when the battery 110 is overheated, even if all other modules of the aerosol generating device 100 are in a normal state, it may be considered that the overall state of the aerosol generating device 100 is not good. In this case, the aerosol generating device 100 may not operate normally.

The processor 120 monitors the state of each module included in the aerosol generating device 100, In addition, the processor 120 may determine the overall state of the aerosol generating device 100 based on the monitoring result, and control the display 160 to output visual information representing the determined state. Accordingly, the user may be able to check the state of the aerosol generating device 100 quickly, and take various actions (e.g., resetting the aerosol generating device 100 visiting a repair center, etc.) based on the current state of the aerosol generating device 100.

Hereinafter, example operations of the processor 120 will be described with reference to FIGS. 5 to 9C.

Figure 5:
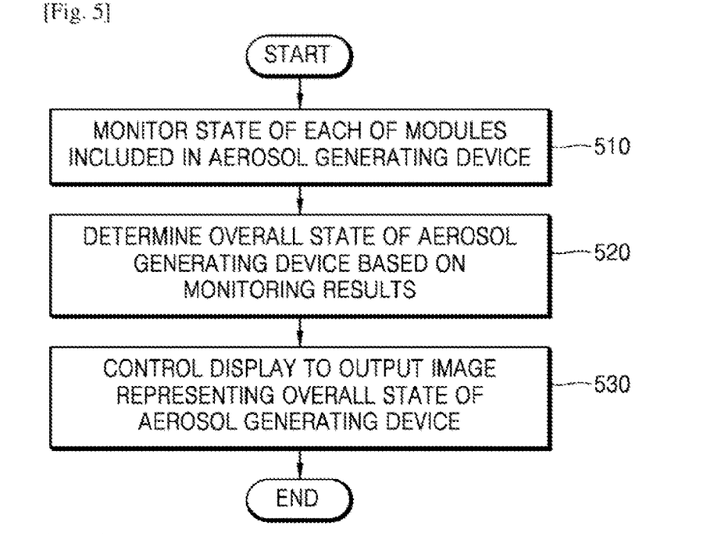
FIG. 5 is a flowchart illustrating an example of a method of controlling an aerosol orating device by a processor.

FIG. 5 is a flowchart illustrating an example of a method of control aerosol generating device by a processor.

Referring to FIG. 5, a method of controlling an aerosol generating device includes operations processed by the processor 120 shown in FIGS. 1 to 4. Accordingly, although omitted below, the descriptions described above with respect to the processor 120 illustrated in FIGS. 1 to 4 may also be applied to the method of controlling the aerosol generating device of FIG. 5.

In operation 510, the processor 120 monitors the state of each module included in aerosol generating device 100.

The modules refer to components included in the aerosol generating device 100. For example, the module may include a battery 110, an electronic module operating using power from the battery 110, and a mechanical module.

The state of the module means the current condition of the module. For example, the current condition of a module may indicate whether the module is functioning normally (e.g., whether the module is overheated, whether the module normally communicates with other modules, etc.).

The processor 120 may monitor the states of the battery 110 and the processor 120. In the aerosol generating device 100, the battery 110 may supply power to the modules, and the processor 120 may control the operation of the modules. Therefore, the battery 110 and the processor 120 may be treated as major modules of the aerosol generating device 100. Accordingly, the states of the battery 110 and the processor 120 may be an important factor in determining the overall state of the aerosol generating device 100. However, as described above, the processor 120 may monitor the states of other modules other than the battery 110 and the processor 120.

The processor 120 may monitor the state of a module (hereinafter "first module") based on information collected from the first module or information collected from another module (hereinafter "second module") connected to the first module. For example, the aerosol generating device 100 may include a second module that generates information about the state of the first module. Accordingly, the processor 120 may monitor the state of the first module based on the information collected from the second module.

Hereinafter, examples of the second module will be described with reference to FIG. 6.

Figure 6:
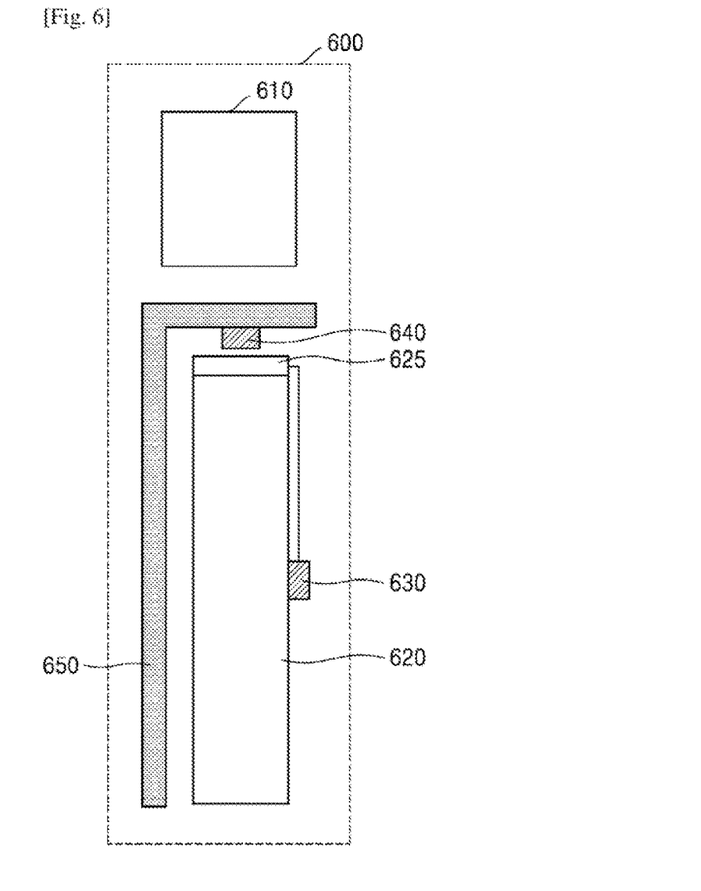
FIG. 6 is a diagram for describing an example of module included in an aerosol generating device.

FIG. 6 illustrates an example of a module included in an aerosol generating device.

FIG. 6 schematically shows a vertical cross-sectional view of an aerosol generating device 600. The aerosol generating device 600 of FIG. 6 may be an example of an implementation of the aerosol generating device 100 illustrated in FIGS. 1 to 4. In the present specification, the positional relationship of the components will be described in such a way that a heater 610 is positioned above a battery 620 and the long part of a printed circuit board (PCB) 650 is disposed to face the front surface of the battery 620. However, the orientations of the components may be different depending on the viewpoint of looking at the aerosol generating device 600.

Referring to FIG. 6, the aerosol generating device 600 may include the heater 610, the battery 620, a protection circuit module (PCM) 625, a first thermistor 630, a second thermistor 640, and the PCB 650. FIG. 6 only shows certain components of the aerosol generating device 600 which are particularly related to the present embodiment. Accordingly, it may be understood by those of ordinary skill in the art related to the present embodiment that other components may be further included in the aerosol generating device 600.

The heater 610 is a component for heating the cigarette inserted in an accommodation space of the aerosol generating device 600. Because the heater 610 of FIG. 6 corresponds to the heater 130 of FIGS. 1 to 4, descriptions that are the same as those of the heater 130 will be omitted. As aforementioned, the heater 610 may include a plurality of modules (e.g., a susceptor and an induction coil), but for convenience of description, the heater 610 is illustrated as a single block.

The battery 620 supplies power to the electronic modules of the aerosol generating device 600. Although omitted in FIG. 6, the battery 620 and the electronic modules may be electrically connected. For example, the battery 620 may be connected to the heater 610 through the PCB 650 or may be directly connected to the heater 610.

The PCM 625 may be disposed adjacent to the upper surface of the battery 620. The PCM 625 is a circuit that protects the battery 620 by preventing overcharging and over-discharging of the battery 620. In addition, the PCM 625 may prevent overcurrent from occurring in the battery 620 and may cut off the current when a short circuit occurs in a circuit connected to the battery 620.

The PCB 650 may correspond to a substrate including the processor 120. In addition, the PCB 650 may include a charger IC involved in the operation of the battery 620 and a heater IC involved in the operation of the heater 610. For example, the charger IC may include a circuit for controlling and monitoring the battery 620, and the heater IC may include a circuit for controlling and monitoring the heater 610. The arrangement of the charging IC and the heating IC may differ according to embodiments.

The first thermistor 630 is a resistor whose electrical resistance value changes sensitively by temperature change, and may be used to sense the temperature of the battery 620. The first thermistor 630 may be electrically connected to the PCM 625 disposed on the upper surface of the battery 620, and information measured using the first thermistor 630 may be transmitted to the processor 120 through the PCM 625.

A second thermistor 640 may be used to sense the temperature of the PCB 650. For example, the second thermistor 640 may be disposed adjacent to a portion of the PCB 650 located between the heater 610 and the battery 620. Because a region between the heater 610 and the battery 620 is likely to have the highest temperature in the aerosol generating device 600, this region may be suitable for determining not only the temperature of the PCB 650 but also the Overall overheating state of the aerosol generating device 600.

As described above with reference to FIG. 5, the processor 120 may monitor the state of the first module based on information collected from the first module or information collected from the second module. In FIG. 6, a heater 610, a battery 620, and a PCB 650 are shown as examples of the first module, and a first thermistor 630 and a second thermistor 640 are shown as examples of the second module. In addition, although not shown in FIG. 6, a charging IC and a heating IC may be included as examples of the second module.

According to an embodiment, in order to monitor the state of the battery 620, the processor 120 may check the temperature of the battery 620 sensed by the first thermistor 630. For example, when the temperature checked by the first thermistor 630 is about 15° C. to 28° C., the processor 120 may determine that the battery 620 is not operating or is in a standby state. Alternatively, when the temperature checked by the first thermistor 630 is higher than about 28° C., the processor 120 may determine that the battery 620 is operating. However, the above-described temperature range is an example for convenience of description, and is not an absolute criterion for determining the state of the battery 620.

As another example, the processor 120 may monitor the state of the battery 620 using information collected from the charger IC. The charger IC may generate information about the operation of the battery 620 and the generated information may be provided to the processor 120. Also, information generated by the charger IC may be stored in a memory. For example, the charger IC may generate various information about the battery 620, such as the accumulated number of times of charging the battery 620, the amount of current when the aerosol generating device 600 is in a standby state, information on the state of charge of the battery 620, and so on. For example, when the cumulative number of times of charging the battery 620 exceeds a temperature threshold (e.g., 500 times) that is predetermined for the reliability of the battery 620, the processor 120 may determine that the battery 620 has reached or is near the end of its life. However, the above-described temperature threshold is only an example, and is not an absolute criterion for determining the state of the battery 620.

As another example, in order to monitor the state of the processor 120, the processor 120 may check the temperature of the PCB 650 sensed by the second thermistor 640. For example, when the temperature checked by the second thermistor 640 is higher than about 40° C. the processor 120 may determine that its own temperature is in a high state. When the temperature determined by the second thermistor 630 is about 20° C. to about 40° C., the processor 120 may determine that its own temperature is in a normal state. However, the above-described temperature range is an example for convenience of description and is not an absolute criterion for determining the state of the processor 120.

As another example, the processor 120 may monitor the state of the processor 120 or the state of the heater 610 using information collected from the heating IC. The heating IC refers to a module that communicates with the processor 120 and is involved in the operation of the heater 610. Accordingly, the processor 120 may check whether the processor 120 operates normally based on whether or not communication with the heating IC is performed smoothly, and may also monitor the state of the heating IC using information collected from the heating IC. In addition, the processor 120 may also monitor the state of the heater 610 by using information collected from the heating IC.

In addition to the above-described examples, the processor 120 may monitor the states of other modules of the aerosol generating device 600. For example, the processor 120 may monitor the state of at least one sensor included in the aerosol generating device 600.

Referring back to FIG. 5, in operation 520, the processor 120 determines the overall state of the aerosol generating device 100 based on the monitoring results.

The processor 120 may map the monitoring results of operation 510 to numerical values. In addition, the processor 120 may perform a mathematical operation using the numerical values, and determine the overall state of the aerosol generating device 100 based on the result of the operation.

In this case, the processor 120 may determine the overall state of the aerosol generating device 100 by comparing the result of the operation with a preset reference. Accordingly, the overall state of the aerosol generating device 100 may be output in a specific term indicating a state (e.g., good, normal, danger, etc.), instead of a numerical value.

Hereinafter, an example in which the processor 120 determines the overall state of the aerosol generating device 100 will be described with reference to FIGS. 7 and 8.

Figure 7:
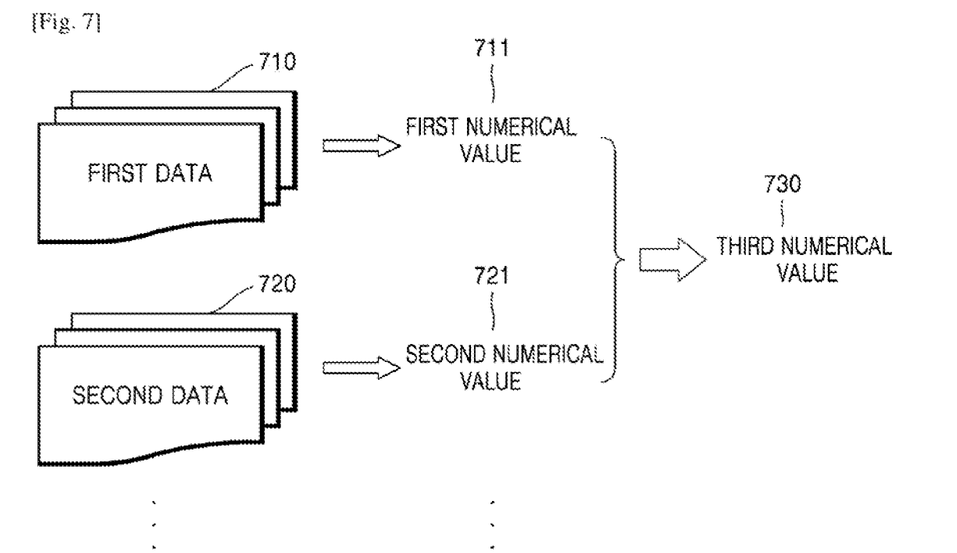
FIG. 7 is a diagram illustrating an example in which a processor performs a mathematical operation.

FIG. 7 is a diagram illustrating an example in which a processor performs a mathematical operation.

Referring to FIG. 7, a processor 120 may determine the overall state of an aerosol generating device 100 using first data 710 and second data 720. FIG. 7 shows two types of data used by the processor 120 (i.e., the first data 710 and the second data 720) for convenience of explanation, but the processor 120 may determine the overall state of the aerosol generating device 100 by using more data.

Here, the first data 710 and the second data 720 refer to data representing the states of be modules included in the aerosol generating device 100. For example, the first data 710 may be data indicating the state of the battery 110, including information about a temperature sensed by the first thermistor 630 and/or information collected from a charger IC. In addition, the second data 720 may be data indicating the state of the processor 120, including information indicating a temperature sensed by the second thermistor 640 and/or information collected from a heating IC.

The processor 120 maps the first data 710 and the second data 720 to a first numerical value 711 and a second numerical value 721, respectively. Here, the first numerical value 711 and the second numerical value 721 may be values indicating the current states of the modules. In addition, the first numerical value 711 and the second numerical value 721 may be relative values determined in a range of 0 to 100. Provided that the first data 710 is data representing the temperature of the battery 110, and the temperature of the battery 110 is about 30° C., indicating that the battery 110 is in a good state, the processor 120 may set the first numerical value 711 to 80. In addition, provided that the second data 720 is data representing the temperature of the PCB 650, and the temperature of the PCB 650 is about 20° C., indicating that the battery 110 is in a good state, the processor 120 may set the second numerical value 721 to 85. However, the first numerical value 711 and the second numerical value 721 described above are only examples and embodiments are not limited thereto.

The processor 120 may derive the third numerical value 730 by performing a mathematical operation using the first numerical value 711 and the second numerical value 721. Here, the mathematical operation may be applied without limitation as long as it is a method using the first numerical value 711 and the second numerical value 721. For example, the mathematical operation method may include various methods for deriving an average value (e.g., arithmetic average, geometric average, harmonic average, etc.), but is not limited thereto.

Accordingly, the processor 120 may set the weights of the first numerical value 711 and the second numerical value 721 to different values. For example, the processor 120 may assign a greater weight to a value representing an important factor in determining the overall state of the aerosol generating device 100 than other numerical values, and a mathematical operation may be performed based on the assigned weight.

In addition, the state of a single module may be expressed by a plurality of numerical values. For example, when the processor 120 determines the overall state of the aerosol generating device 100 based on the states of the battery 110 and the state of the processor 120, there may be a plurality of numerical values representing the state of the battery 110 and a plurality of numerical values representing the state of the processor 120. In more detail, the plurality of numerical values indicating the state of the battery 110 may include a numerical value indicating a temperature, a numerical value indicating a cumulative number of times of charging, a numerical value indicating a charging status, and the like. In addition, the plurality of numerical values indicating the state of the processor 120 may include a numerical value indicating a temperature of the PCB 650, a numerical value indicating whether the processor 120 operates normally, and the like. Even in this case, the processor 120 may derive the third numerical value 730 by using all of the plurality of numerical values. In addition, the processor 120 may perform a mathematical operation by applying different weights to the plurality of values, FIG. 8 is a diagram for describing an example in which a processor compares an operation result with a preset reference.

Figure 8:
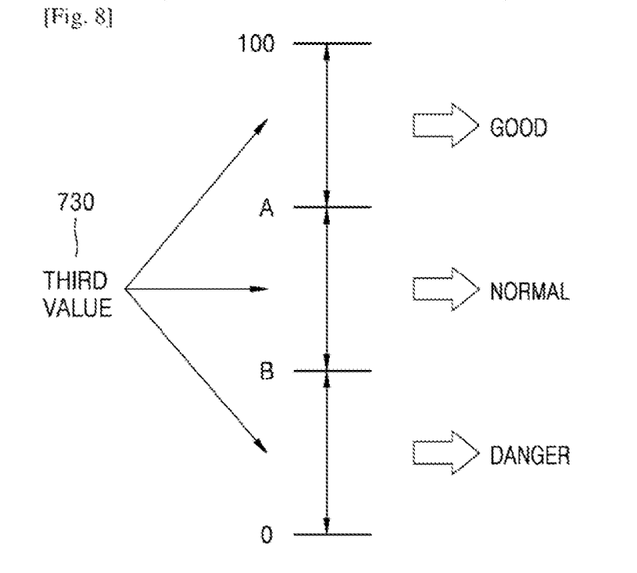
FIG. 8 is a diagram for describing an example in which as processor compares an operation result with a preset reference.

Referring to FIG. 8, a processor 120 may determine the overall state of an aerosol generating device 100 by comparing a third numerical value 730 with a preset reference. As described above with reference to FIG. 7, the first numerical value 711 and the second numerical value 721 may be relative values determined within a range of 0 to 100. Accordingly, the third numerical value 731 may also be a specific value within the range of 0 to 100.

'A' and 'B' shown in FIG. 8 are criteria for classifying the third numerical value 731. That is, the third numerical value 731 may be classified into one of a plurality of groups representing different states of the aerosol generating device 100, depending on how the values A and B are set. Here, 'A' and 'B' may be determined in advance when the aerosol generating device 100 is manufactured, or may be adjusted later by a user.

In FIG. 8, it is shown that the overall state of the aerosol generating device 100 is determined to be in one of three groups (i.e., 'good', 'normal', and 'danger'), but embodiments are not limited thereto. In other words, the number of the groups may be greater or less than three.

Once the processor 120 determines a group to which the third value 730 belongs to by comparing the third numerical value 730 with at least one preset reference, the overall state of the aerosol generating device 100 may be output in words rather than in a numerical value. Accordingly, the user may intuitively grasp the overall state of the aerosol generating device 100.

Alternatively, the processor 120 may output the third numerical value 730 or another numerical value associated with the third numerical value 730 to indicate the overall state of the aerosol generating device 100, so that the user may obtain more specific information on the overall state of the aerosol generating device 100.

Referring back to FIG. 5, in operation 530, the processor 120 may control the display 160 output visual information (e.g, an image) representing the overall state of the aerosol generating device 100.

The processor 120 may output visual information indicating the overall state of the aerosol generating device 100 through the display 160. Although not shown in FIG. 5, when a speaker and/or a motor are included in the aerosol generating device 100, the processor 120 may control a speaker and/or a motor to output auditory information and/or tactile information indicating the overall state of the aerosol generating device 100.

Meanwhile, the processor 120 may control the display 160 to output not only information indicating the overall state of the aerosol generating device 100 but also information indicating the state of each module individually. Hereinafter, examples of the visual information displayed by a display 160 will be described with reference to FIGS. 9A to 9C.

Figure 9A:
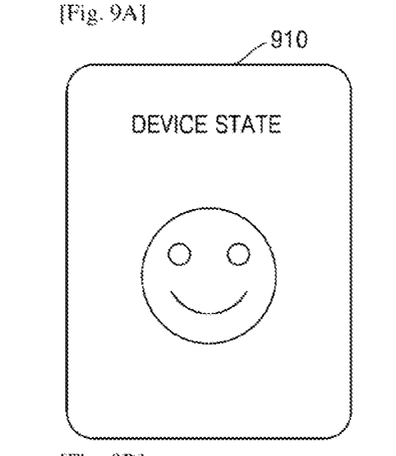
FIGS. 9A to 9C are diagrams for explaining example of information output on a display.
Figure 9B:
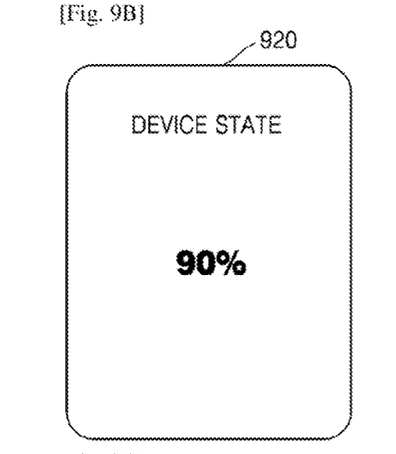
Figure 9C:
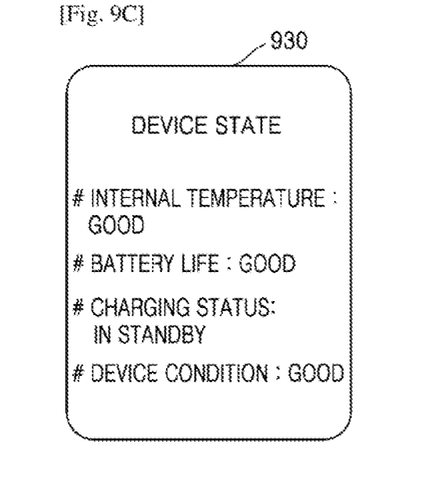

FIGS. 9A to 9C illustrate examples of visual information 910, 920, and 930 output by the display 160.

As an example, referring to FIG. 9A, the visual information 910 may represent the overall state of the aerosol generating device 100. In detail, the visual information 910 may include an intuitive image that represents the overall state of the aerosol generating device 100. Accordingly, the user may grasp the overall state of the aerosol generating device 100 at a glance through the visual information 910.

As another example, referring to FIG. 9B, the visual information 920 may include a specific numerical value representing the overall state of the aerosol generating device 100. Accordingly, the user may obtain more, specific information about the overall state of the aerosol generating device 100 through the numerical value.

As another example, referring to FIG. 9C, the visual information 930 may briefly describe the states of the modules individually. Accordingly, the user may more specifically grasp the current state of each module.

Meanwhile, although not shown in FIGS. 9A to 9C, the processor 120 may control the display 160 to output a solution corresponding to the overall state of the aerosol generating device 100.

When an error occurs in the aerosol generating device 100, the user needs to take a specific action. For example, the user may need to reset the aerosol generating device 100 or visit a repair center. The processor 120 may determine a solution corresponding to the overall state of the aerosol generating device 1000 and output the solution through the display 160. Therefore, the aerosol generating device 100 may provide the user with an appropriate solution when an error occurs in the aerosol generating device 100.

Meanwhile, when the aerosol generating device 100 includes a communication interface, the processor 120 may transmit data through the communication interface so that visual information 910, 920, and 930 is output to an external device. For example, when the aerosol generating device 100 is wirelessly connected to a personal computer (PC) or a smart phone, the processor 120 may transmit data corresponding to the visual information 910, 920, and 930 to the PC or smart phone. Therefore, the user may also check the visual information 910, 920, and 930 through the PC or the smart phone.

According to the embodiments, the processor 120 may determine the overall state of the aerosol generating device 100 based on the states of the modules of the aerosol generating device 100. As a result, the user may check the current state of the aerosol generating device at a glance, and various actions may be taken depending on the current state of the aerosol generating device (e.g., reset the aerosol generating device, visit a repair center, etc.).

At least one of the components, elements, modules or units (collectively "components" in this paragraph) represented by a block in the drawings may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a pail, of code, which contains one or more executable instructions for performing, specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

The above-described method can be written as computer programs executable on a computer and can be implemented in general-use digital computers that execute the programs using a computer-readable recording medium. Also, data structures used in the above-described method may be written to the computer-readable recording medium using various means. Examples of the computer-readable recording medium include magnetic storage media (e.g., ROM, RAM, USB, floppy disks, hard disks, etc.) and optical reading media (e.g., CD-ROMs or DVDs).

Those of ordinary skill in the art related to the present embodiments may understand that various changes in form and details can be made therein without departing from the scope of the characteristics described above. Therefore, the disclosed methods should be considered in a descriptive point of view, not a restrictive point of view.

The scope of the present disclosure is defined by the appended claims rather than by the foregoing description, and all differences within the scope of equivalents thereof should be construed as being included in the present disclosure.

The invention claimed is:

1. An aerosol generating device comprising:
a display; and
a processor configured to:
monitor respective states of a plurality of modules included in the aerosol generating device,
perform a mathematical operation using numerical values corresponding to monitoring results,
determine an overall state of the aerosol generating device based on a result of the mathematical operation, and
control the display to output visual information representing the overall state.

2. The aerosol generating device of claim 1, wherein the processor is further configured to determine the overall state by comparing the result of the mathematical operation with a preset reference.

3. The aerosol generating device of claim 1, wherein the processor is further configured to determine the overall state of the aerosol generating device based on a state of the processor and a state of a battery included in the aerosol generating device.

4. The aerosol generating device of claim 3, wherein the processor is further configured to monitor the state of the battery based on a temperature of the battery and information collected from a charger integrated circuit (IC) connected to the battery.

5. The aerosol generating device of claim 3, wherein the processor is further configured to monitor the state of the processor based on a temperature of a substrate including the processor and information collected from a heating integrated circuit (IC) connected to the processor.

6. The aerosol generating device of claim 1, wherein the processor is further configured to determine the overall state of the aerosol generating device based on a state of at least one sensor included in the aerosol generating device.

7. The aerosol generating device of claim 1, wherein the processor is further configured to determine the overall state of the aerosol generating device based on a state of a heater included in the aerosol generating device.

8. The aerosol generating device of claim 1, wherein the processor is further configured to control the display to output information indicating a state of each of the modules individually.

9. The aerosol generating device of claim 1, wherein the processor is further configured to control the display to output at least one solution based on the overall state.

10. The aerosol generating device of claim 1, wherein
the aerosol generating device further includes a communication interface configured to perform wireless communication with an external device, and
the processor is further configured to transmit data through the communication interface so that the visual information is output to the external device.

11. A method of controlling an aerosol generating device, the method comprising:
monitoring respective states of modules included in the aerosol generating device;
performing a mathematical operation using numerical values corresponding to monitoring results;
determining an overall state of the aerosol generating device based on a result of the mathematical operation; and
controlling a display to output visual information representing the overall state.

12. A non-transitory computer readable medium storing program instructions for causing one or more processors to:
monitor respective states of a plurality of modules included in an aerosol generating device,
perform a mathematical operation using numerical values corresponding to monitoring results,
determine an overall state of the aerosol generating device based on a result of the mathematical operation, and
control a display to output visual information representing the overall state.

* * * * *